US009205354B2

(12) United States Patent
Thienel

(10) Patent No.: US 9,205,354 B2
(45) Date of Patent: Dec. 8, 2015

(54) FILTER

(75) Inventor: Michael Thienel, Thurnau (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 362 days.

(21) Appl. No.: 13/387,651

(22) PCT Filed: Jul. 30, 2010

(86) PCT No.: PCT/EP2010/061101
§ 371 (c)(1),
(2), (4) Date: Apr. 5, 2012

(87) PCT Pub. No.: WO2011/012695
PCT Pub. Date: Feb. 3, 2011

(65) Prior Publication Data
US 2012/0180750 A1 Jul. 19, 2012

(30) Foreign Application Priority Data
Jul. 30, 2009 (DE) .......................... 10 2009 035 683

(51) Int. Cl.
*B01D 27/08* (2006.01)
*B01D 35/30* (2006.01)

(52) U.S. Cl.
CPC .............. *B01D 27/08* (2013.01); *B01D 35/306* (2013.01); *B01D 2201/291* (2013.01); *B01D 2201/34* (2013.01)

(58) Field of Classification Search
None
See application file for complete search history.

(56) References Cited

U.S. PATENT DOCUMENTS

| 3,859,216 | A  | * | 1/1975  | Sisson et al. .................. 210/440 |
| 5,180,490 | A  |   | 1/1993  | Eihusen et al. |
| 6,554,140 | B2 |   | 4/2003  | Steger, Jr. et al. |
| 2002/0074281 | A1 |   | 6/2002  | Steger, Jr. et al. |
| 2002/0162781 | A1 |   | 11/2002 | Demirdogen |
| 2006/0157403 | A1 | * | 7/2006  | Harder et al. ................. 210/445 |
| 2007/0261377 | A1 | * | 11/2007 | Klug .............................. 55/498 |
| 2009/0145826 | A1 |   | 6/2009  | Calcaterra et al. |

FOREIGN PATENT DOCUMENTS

WO          9904879 A1    2/1999
WO       WO9904879 A1    2/1999

OTHER PUBLICATIONS

EP Office Action of EP 10740597.9 dated Jul. 30, 2014.
WIPO search report of PCT/EP2010/061101, Sep. 11, 2010.

* cited by examiner

*Primary Examiner* — Benjamin Kurtz
(74) *Attorney, Agent, or Firm* — James Hasselbeck

(57) ABSTRACT

A filter (10), particularly a spin-on filter, in particular for motor vehicles, industrial engines, notably an oil filter, fuel filter or coolant filter, comprising a filter housing (18), in which a filter element (30) is accommodated and which has an end face-side connecting end (16) comprising a cover (72), which connecting end can be sealingly connected to a connecting body (14) corresponding to the connecting end (16) by a plug and/or rotary movement (S, D), wherein the cover (72) has an opening (82) for a fluid connection between the connecting body (14) and the filter housing (18). At the connecting end (16) of the filter housing (18), a sealing region (72b) and a holding region (72a) are disposed, which run concentrically substantially axially to the plug direction (S) and are directed radially inward and which can interact with a radially outwardly directed holding region (110) of the connecting body (14) that runs substantially axially.

5 Claims, 4 Drawing Sheets

FILTER

CROSS REFERENCE TO RELATED APPLICATIONS

This application is US National Stage Entry of international patent application no. PCT/EP2010/061101, filed Jul. 30, 2010 designating the United States of America. Priority is claimed based on Federal Republic of Germany patent application no. 10 2009 035 683.5, filed Jul. 30, 2009, the entire disclosure of which is incorporated herein by reference.

TECHNICAL FIELD

The invention concerns a filter, in particular an exchangeable filter, in particular for motor vehicles, industrial motors, especially oil filter, fuel filter or cooling agent filter, comprising a filter housing in which a filter element is arranged and that has a terminal coupling end with a cover, the terminal coupling end seal-tightly connectable to a coupling member matching the coupling end by an insertion and/or rotational movement, wherein the cover has an opening for a fluid connection between the coupling member and the filter housing.

Moreover, the invention concerns an internal combustion engine with a coupling head for a filter.

PRIOR ART

Exchangeable filters for motor vehicles as they are commercially known are sealed in axial direction relative to a filter head. Pressure increases in the exchangeable filter can cause deformation of the cover and thus enlargement of the sealing area to be sealed. In this way, the surface pressure at the seal is lowered which may cause leakage.

The invention has the object to design a simple and reliable filter and an internal combustion engine of the aforementioned kind in such a way that filtration is improved and seal-tightness of the connection of the filter housing with the coupling member is optimized.

SUMMARY OF THE INVENTION

This object is solved according to the invention in that at the coupling end of the filter housing a sealing area and a securing area are arranged that extend concentrically substantially in axial direction to the insertion or rotation direction and that are facing in radial direction inwardly and that can interact with a corresponding, in radial direction outwardly facing, substantially axially extending sealing area and a securing area of the coupling member.

According to the invention, the securing function is thus separate from the sealing function. An effect of possibly occurring forces on the sealing function, in particular by pulsating pressure changes in the filter housing, is reduced in this way. Moreover, in this configuration a seal acting in radial direction is possible. The latter has the advantage relative to known axial seals of the prior art that its sealing action will not decrease upon pressure increases in the filter housing. In case of known axial seals, the sealing gap between two surfaces to be sealed can be enlarged by pressure in the filter housing; this can cause impairment of seal-tightness. Moreover, radial sealing surfaces compensate tolerances with respect to axial movement of the sealing surfaces relative to each other.

In an advantageous embodiment, the securing area can be inwardly positioned in radial direction on the coupling end and can be provided with connecting elements of a detachable quick connection, in particular an insertion-rotation connection, preferably a screw connection or a bayonet connection or a snap connection, that interact with corresponding connecting elements of the radial inner securing area of the coupling member and the radial outer sealing area on the coupling end can partially form sealing elements, in particular with a sealing surface, that can interact seal-tightly in radial direction with corresponding sealing elements, in particular with a sealing surface or a radial seal, of the radial outer sealing area of the coupling member. The advantage of a detachable quick connection is that the filter housing and the coupling member can be separated easily, in particular in case of servicing or repair work. Insertion/rotation connections, such as in particular bayonet connections, have moreover the advantage that they have a great support and securing force that can be achieved even with minimal mounting forces and enable fast mounting and demounting. Moreover, with insertion/rotation connections, the utilization of the filter closure system within very tight spaces can be realized moreover.

In a further advantageous embodiment, the cover can have an S-shaped profile wherein the legs of the profile can form at least partially the sealing area and the securing area on the coupling end of the filter housing. This improves the securing action of the coupling counter member in the receiving space and counteracts deformations in the area of the filter closure system as a result of temperature and/or pressure changes. The contact surface improves moreover the guiding action for the coupling counter member upon insertion.

In an alternative advantageous embodiment, the cover can have a U-shaped profile wherein the legs of the profile at least partially form the sealing area and the securing area on the coupling end of the filter housing. The U-shaped profile can be realized in a simple way.

In one embodiment, the outer leg of the S-shaped or U-shaped profiled cover extends axially away from the filter housing and is connected to the filter housing in particular by means of a crimp connection and/or another joining technique such as an adhesive connection.

In one embodiment, the radial inner leg of the S-shaped profiled cover can be oriented axially in the direction of the filter housing interior.

In one embodiment, the inner leg of the U-shaped profiled cover extends axially away from the filter housing interior.

In one embodiment, the securing area of the cover is arranged in radial direction inwardly on the inner leg of the S-shaped or U-shaped profiled cover, in particular in the form of an inner thread.

In one embodiment, the part of the filter housing, in particular of the filter cup, that has been folded upon crimping in radial direction inwardly about the outer leg of the cover, forms a radial sealing surface, in particular for engagement of a radial seal at the socket, in particular for sealing relative to the environment.

In one embodiment, the cover forms between the inner and the outer legs a closed circular ring that, aside from the central opening formed by the securing area, has no further openings. In this connection, preferably by the central opening or the securing area the inflow opening of the filter is formed.

In one embodiment, the outlet at the clean side is formed by a coupling socket that passes through the central opening of the cover and is in particular provided at the cover. In this context, the coupling socket engages an outlet opening of the element cover (also referred to as terminal disk) of the filter insert wherein the sealing action between raw side and clean side is realized by means of a radial seal that is mounted on the terminal disk of the filter insert and engages the coupling socket.

In one embodiment, the inner diameter of the inner leg is at least twice as large as the inner diameter of the outlet opening of the element cover or the inner diameter of its radial seal. This has the advantage that an annular inlet cross-section is formed that is sufficiently large for a pressure loss as minimal as possible.

In one embodiment, the inner diameter of the inner leg is at least half the size of the outer diameter of the outer leg, preferably greater than 60% of the outer diameter. In this way, the deformation under pressure load can be reduced.

In one embodiment, at the cover the filter has a coupling end for coupling to a coupling flange.

In one embodiment, the coupling flange has several, in particular circularly arranged, inlet openings for inflow of liquid to be filtered into the filter. In this connection, preferably centrally and concentrically thereto an outlet, in particular in the form of a projecting coupling socket is arranged on the coupling flange.

In one embodiment, the coupling flange has on its side that is facing the filter housing a radial inner securing cylinder and a radial outer sealing cylinder that extend axially to an insertion direction of the filter housing. In this context, the securing cylinder and the sealing cylinder surround the inlet openings. The securing cylinder has preferably on its radial outer circumferential side an outer thread for connection with an inner thread on the filter, in particular on the cover. In the radial outer circumferential side of the sealing cylinder that forms a flange sealing surface, a sealing groove with a radially acting seal is preferably arranged furthermore.

In one embodiment, the filter comprises in the filter housing a filter insert or a filter element. The filter insert comprises an element cover that is facing the coupling flange, an element bottom that is facing a bottom of the filter housing, and a skeleton-like central tube that extends between the element cover and the element bottom. In this connection, the central tube is surrounded by a filter medium in the form of a filter bellows comprised of zigzag-folded filter medium. The central tube delimits an interior of the filter medium.

In one embodiment, the element cover has an outlet opening that is concentric to the central tube. The outlet opening is surrounded on the side that is facing the coupling end by a hollow cylindrical connecting socket. In the connecting socket a coupling socket of the coupling flange is inserted that partially forms the outlet. Preferably, the connecting socket has a radial seal for sealing relative to the coupling socket.

In one embodiment, at the coupling end the element cover of the filter insert and thus also the filter insert is secured with an annular space cover in the filter housing wherein the annular space cover preferably forms at the same time also the housing cover. The element cover has preferably axially extending supports between which connecting channels are realized between the annular coupling space, formed at the raw side between element cover and housing cover, and the annular inlet space that surrounds the filter element at the raw side and in radial direction outwardly.

In one embodiment, the annular space cover, the connecting socket of the element cover, and the element cover delimit the annular coupling space on the side of the element cover that is facing away from the filter medium.

In one embodiment, the annular space cover has a through opening that is concentric to the outlet opening of the element cover for the securing cylinder of the coupling flange. The diameter of the through opening is significantly greater than the diameter of the outlet opening so that the material required for the annular space cover is relatively minimal. In this way, the attack surface for pressure increase in the interior of the filter housing is correspondingly minimal and a possible deformation of the annular space cover is almost impossible. Advantageously, the coupling body can be a coupling head or a coupling flange in particular of an internal combustion engine.

The object is further solved with an internal combustion engine in that it has a coupling head with a sealing area and a securing area for the sealing area and the securing area of a filter according to the invention.

BRIEF DESCRIPTION OF THE DRAWINGS

Further advantages, features and details of the invention result from the following description in which embodiments of the invention will be explained in more detail with the aid of the drawing. A person of skill in the art will consider the features disclosed in combination in the drawing, the description and the claims also individually and combine them to meaningful further combinations. It is shown in:

In the Figures same components are provided with same reference characters.

EMBODIMENT(S) OF THE INVENTION

Figure 1:
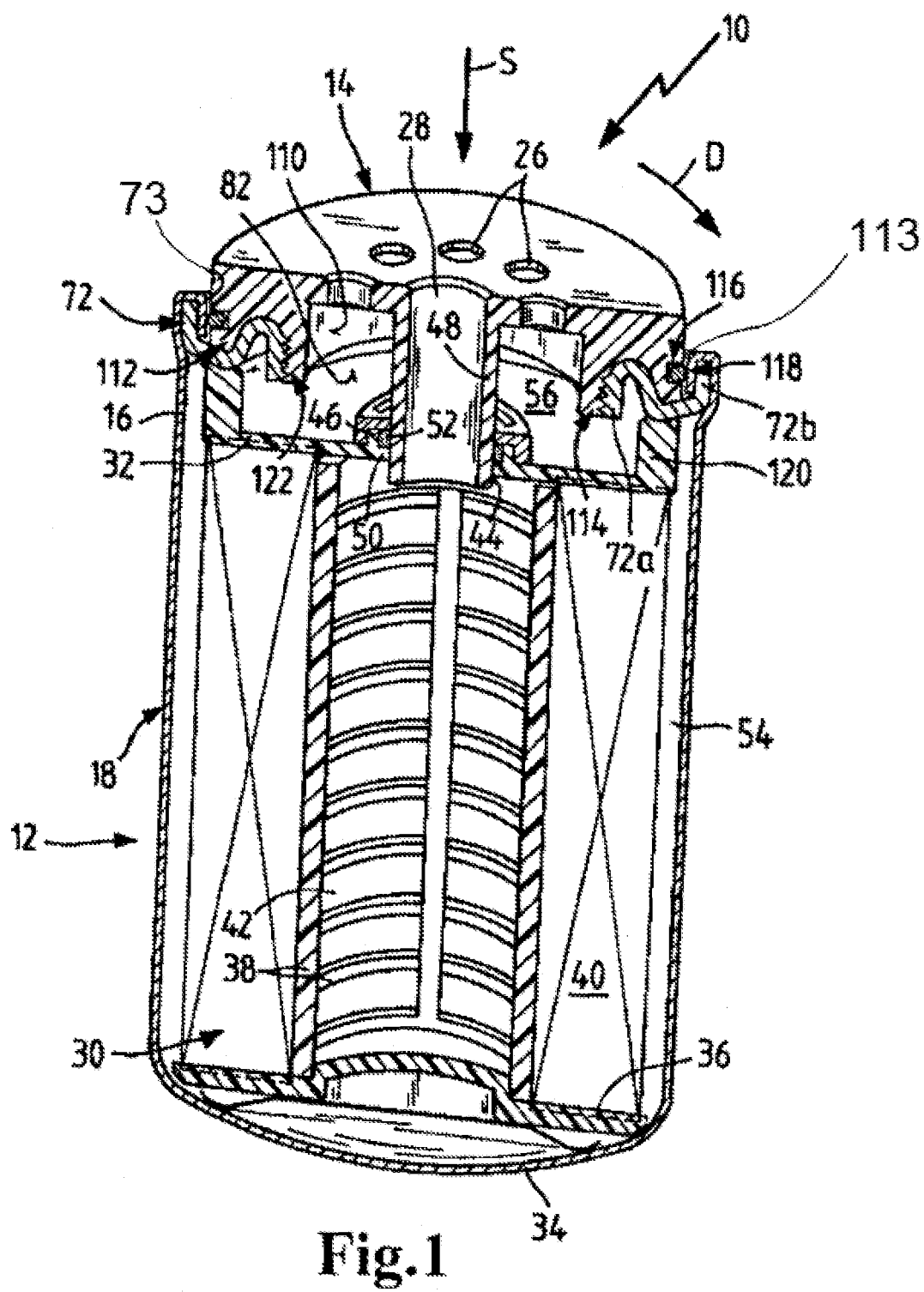
FIG. 1 schematically an isometric longitudinal section illustration of an exchangeable filter with a first embodiment of a filter housing in which a filter insert is arranged and that is seal-tightly connected with a coupling flange.

In FIG. 1, a liquid filter system 10 with an exchangeable filter 12 and a coupling flange 14 is illustrated. In this connection, a terminal circular cylindrical coupling end 16 of a pot-shaped or cup-shaped filter housing 18 of the exchangeable filter 12 is seal-tightly connected to the coupling flange 14. The coupling end 16 engages circumferentially the coupling flange 14. In this context, the coupling flange 14 can be a separate coupling flange 14 or can be formed as a coupling head directly on a component of an internal combustion engine. The liquid filter system 10 can be used for liquids of any kind of an internal combustion engine as, for example, oil, fuels, hydraulic liquids or also cooling agent.

In the coupling flange 14 a plurality of inlet openings 26 for liquid to be filtered and an outlet 28 for filtered liquid are arranged.

In this connection, the outlet 28 is concentrically arranged relative to the center of the coupling flange 14. The inlet openings 26 are distributed about a concentric circle around the outlet 28.

Moreover, the coupling flange 14 has on its side that is facing the filter housing 18 a radial inner securing cylinder 110 and a radial outer sealing cylinder 112 which extends axially relative to an insertion direction S of the filter housing 18. The securing cylinder 110 and the sealing cylinder 112 surround the inlet openings 26. The securing cylinder 110 has on its radial outer circumferential side an external thread 114. In the radial outer circumferential side of the sealing cylinder 112 that forms a flange sealing surface 113 a sealing groove 116 with a radially acting annular seal 118 is arranged.

In the filter housing 18 a filter insert 30 is arranged. The filter insert 30 comprises an element cover 32 that is facing the coupling flange 14, an element bottom 36 that it facing a bottom 34 of the filter housing 18, and a skeleton-type central tube 38 that is extending between the element cover 32 and the element bottom 36. The central tube 38 is surrounded by a filter medium 40 in the form of a filter bellows of zigzag-folded nonwoven. The central tube 38 delimits an interior 42 of the filter medium 40.

The element cover 32 has an outlet opening 44 that is concentric to the central tube 38. The outlet opening 44 is surrounded at the end that is facing the coupling end 16 by a hollow cylindrical connecting socket 46. Into the connecting socket 46 a coupling socket 48 of the coupling flange 14 is inserted that partially forms the outlet 28. On its radial inner circumferential side the connecting socket 46 has a sealing ring stage 50 that extends inwardly in radial direction. On the sealing ring stage 50 an O-ring seal 52 is resting that is located between the inner wall of the connecting socket 46 and the outer wall of the coupling socket 48.

The filter medium 40 is surrounded by an annular inlet space 54 which, by means of an annular coupling space 56 to be explained in the following in more detail, is in communication with the inlet openings 26 of the coupling flange 14. The filter medium 40 can be flowed through by the liquid to be filtered in radial direction from the exterior to the interior from the annular inlet space 54 to the interior 42.

The element cover 32 of the filter insert 30 and thus also the filter insert 30 are secured relative to the coupling end 16 with an annular space cover 72 in the filter housing 18. The element cover 32 has axially extending supports 120 between which connecting passages between the annular coupling space 56 and the annular inlet space 54 are realized. The annular space cover 72 is coaxially arranged within the coupling end 16 relative to the latter.

On the side of the element cover 32 that is facing away from the filter medium 40 the annular space cover 72, the connecting socket 46 of the element cover 32, and the element cover 32 delimit the annular coupling space 56.

The annular space cover 72 has a through opening 82 for the securing cylinder 110 of the coupling flange 14 that is coaxial to the outlet opening 44 of the element cover 32. The diameter of the through opening 82 is significantly larger than the diameter of the outlet opening 44 so that the material required for the annular space cover 72 is relatively minimal. In this way, also the attack surface upon pressure increase in the interior of the filter housing 18 is correspondingly minimal and a possible deformation of the annular space cover 72 is almost impossible.

The annular space cover 72 has an S-shaped profile. The free end of the radial inner leg 72a faces the interior of the filter housing 18. The free end of the radial outer leg 72b faces away from the interior of the filter housing 18. The radial inner leg 72a of the profile forms a securing section at the coupling end 16 of the filter housing 18. It has on its radial inner surface an inner thread 122 which matches the outer thread 114 of the securing cylinder 110 of the coupling flange. The radial outer leg 72b is fixedly connected by means of a crimp connection with the edge of the filter housing 18 and forms together with the crimped edge of the filter housing 18 a sealing section wherein the radial inner surface of the crimped edge of the filter housing 18 forms of sealing surface 73 on which the annular seal 118 provided at the sealing cylinder 112 of the coupling flange 14 is radially supported. The securing section and the sealing section are formed or partially formed by the legs 72a and 72b and extend thus concentrically substantially axially to the insertion direction S.

The coupling end 16 of the filter housing 18 can be placed in the axial insertion direction S onto the coupling counter member 20 of the coupling flange 14 and can be screwed to the coupling counter member 20 by an insertion/rotation movement.

Figure 2:
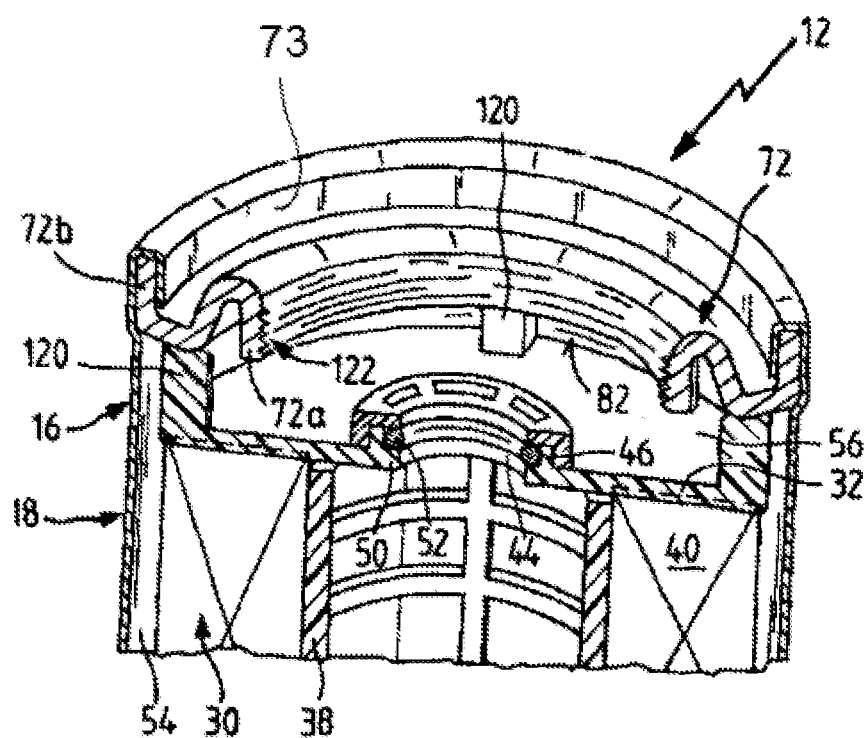
FIG. 2 schematically a detail of the filter housing of FIG. 1 without coupling flange.
Figure 3:
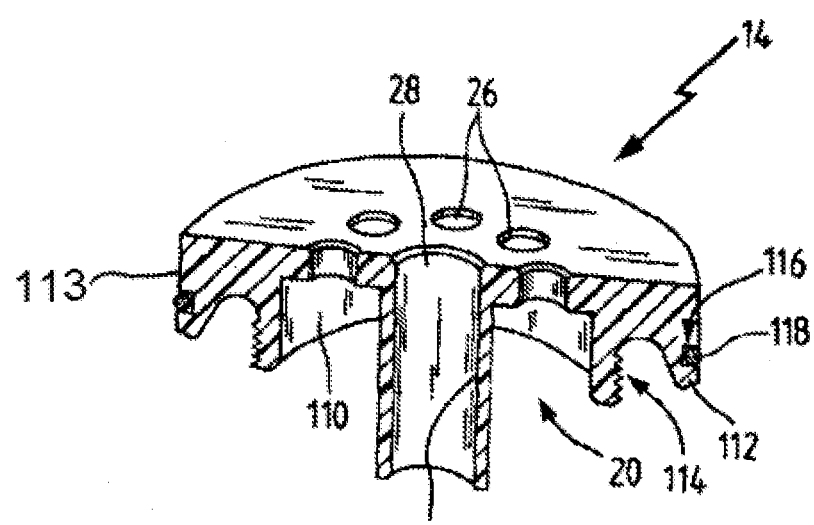
FIG. 3 schematically the coupling flange of FIG. 1 in longitudinal section.
Figure 4:
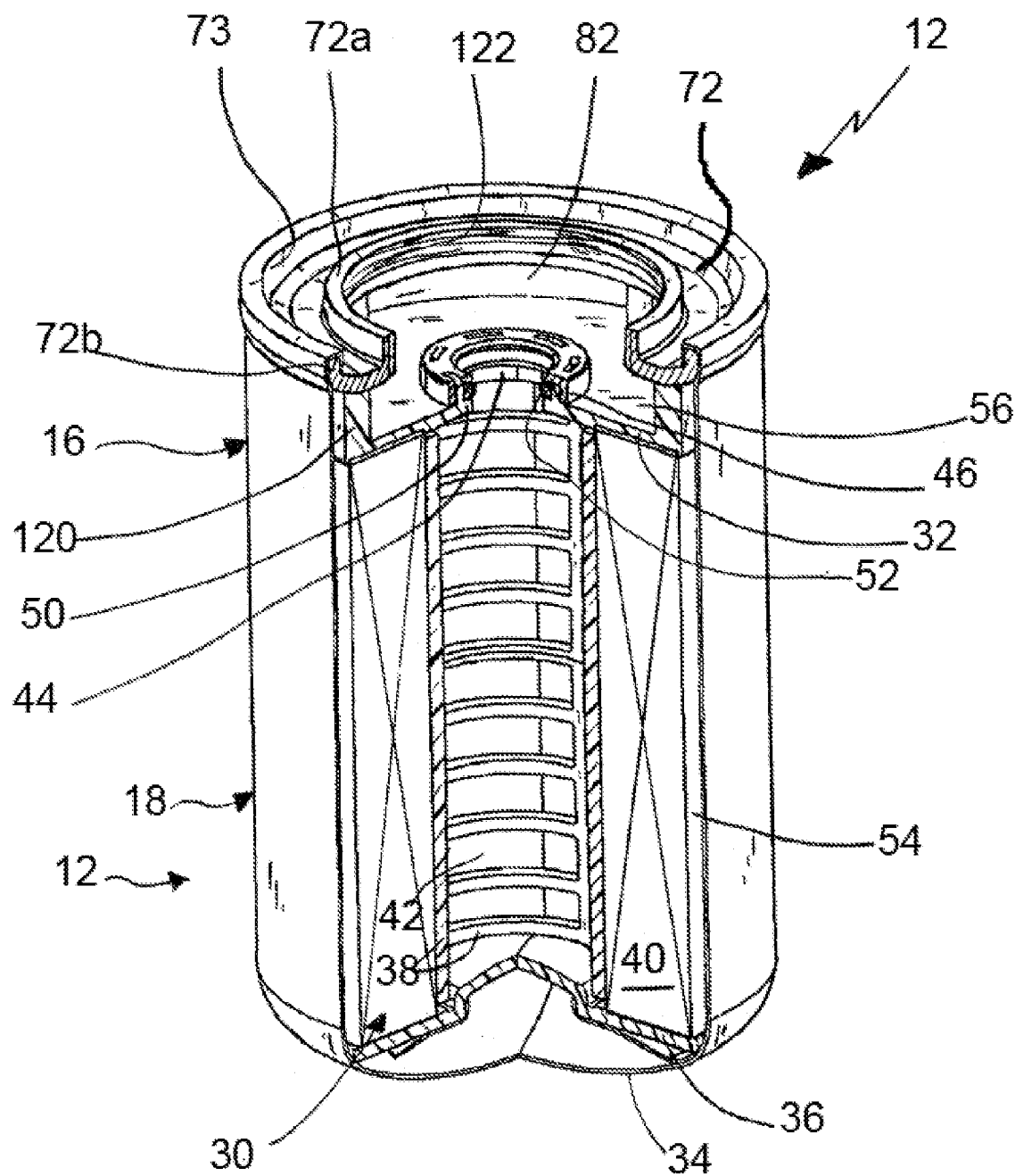
FIG. 4 schematically an isometric, partially sectioned illustration of a second embodiment of a filter housing of an exchangeable filter that is similar to the filter housing of the FIGS. 1 and 2.

In a second embodiment, illustrated in FIG. 4, those elements that are similar to those of the first embodiment described in FIGS. 1 to 3 are provided with the same reference characters so that reference is being had with respect to their description to the description of the first embodiment. This embodiment differs from the first in that the annular space cover 72 has in place of an S-shaped profile a U-shaped profile that can be easily manufactured. The free end of the radial inner leg 72a that forms the securing section faces away from the interior of the filter housing 18.

Figure 5:
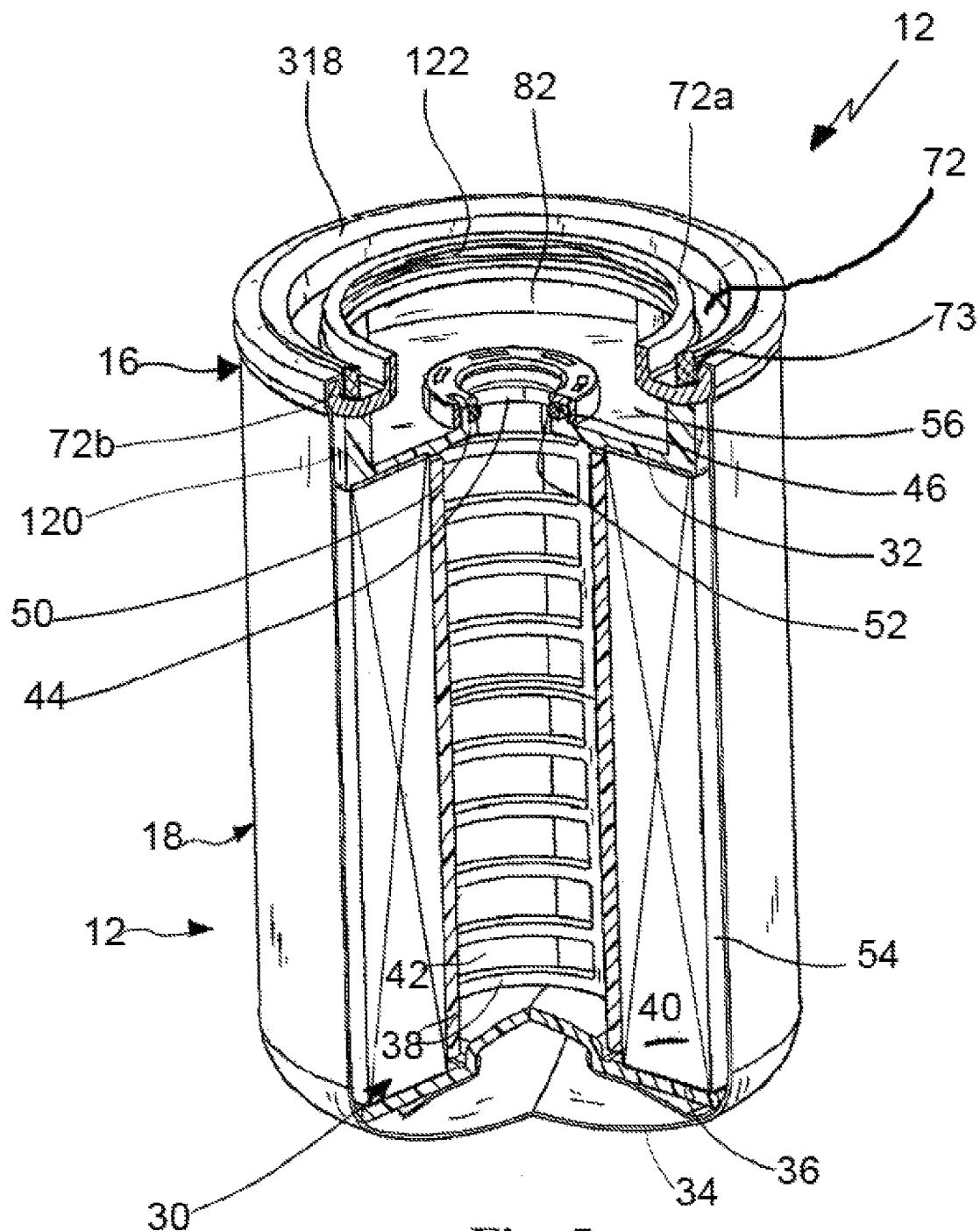
FIG. 5 schematically an isometric, partially sectioned illustration of a third embodiment of a filter housing of an exchangeable filter, which is similar to the filter housings of the FIGS. 1, 2 and 4.

In a third embodiment illustrated in FIG. 5, those elements that are similar to those of the second embodiment described in FIG. 4 are provided with the same reference characters so that reference is being had with respect to their description to the description of the second or the first embodiment. This embodiment differs from the second and from the first in that an annular seal 318 is arranged between the radial outer leg 72b and the radial inner leg 72a of the annular space cover 72 and rests with its radial outer side on the sealing surface 73 of the crimped edge of the filter housing 18. The annular seal 318 replaces the annular seal 118 in the sealing groove 116 of the coupling flange 14 of FIG. 3. In a mounted connecting flange, not illustrated and similar to the coupling flange 14, without annular seal 118 and sealing groove 116, the radial inner side of the annular seal 318 is resting against the corresponding continuous flange sealing surface 113. The annular seal 318 is thus acting in radial direction. Moreover, the annular seal 318 is supported with an end face on the radially extending bottom of the annular space cover 72 and projects in axial direction past the edge of the filter housing 16. The end face of the annular seal 318 that projects past the edge of the filter housing 18 in this way can additionally seal in axial direction against a radial sealing surface of an optional sealing stage of the coupling flange.

In the above described embodiments of a liquid filter system 10 the following modifications are possible inter alia.

The invention is not limited to liquid filter systems 10 for internal combustion engines. It can also be used for other types of filter systems, for example, also for gaseous fluids, in particular compressed air. Such filter systems are generally used in automotive technology or also in industrial motors.

In place of the filter medium 40 that is constructed as a filter bellows of zigzag-folded nonwoven, a different type of filter medium can be used also.

Instead of the screw connection also a different kind of detachable quick connection, in particular insertion/rotation connection or a bayonet connection or a snap connection or another type of insertion and/or rotation connection can be provided. When using a pure insertion connection, the coupling end, the coupling counter member, the connecting socket and coupling socket can also be oval or angular, for example.

Instead of the coupling flange 14 also a different kind of coupling and/or connecting part, for example, a coupling head of a motor vehicle, in particular of an internal combustion engine or an industrial motor or even a simple closure head, can be used.

The invention claimed is:

1. An exchangeable filter (10), comprising:
a filter housing (18) including
a terminal coupling end (16);
an axially opposing closed bottom wall (34); and
a circumferential sidewall extending between said terminal coupling end (16) and said closed bottom wall (34);
a filter element (30) having an filter medium (40) radially surrounding an interior flow space (42), said filter element (30) operable to filter a fluid flowing therethrough, said filter element (30) arranged within said filter housing (18), wherein said filter element (30) includes
an element cover (32) secured to said filter element (30), said element cover (32) connectable seal-tightly with a coupling member (14), wherein said exchangeable filter (10) is replaceably and exchangeably mountable to said coupling member (14) by means of an insertion in an axial insertion direction (S) and/or rotation movement of said exchangeble filter (10) relative to said coupling member (14),
wherein said element cover (32) has an opening (82) extending therethrough for fluid flow connections between said coupling member (14) and an interior of said filter housing (18);
an annular cover (72) secured at said terminal coupling end (16) of said housing (18), said annular cover (72) including
a radially inwardly facing cover sealing area (72b) operable to seal between said terminal coupling end (16) of said housing (18) and said annular cover (72);
a radially inwardly facing cover securing area (72a) arranged concentrically to said cover sealing area (72b), said cover securing and said cover sealing areas extending substantially axially in said insertion direction (S),
wherein the annular cover (72) has an S-shaped profile forming:
a substantially axially extending outer leg (72b) having the cover sealing area (72b) at a free end of the outer leg (72b);
a substantially axially extending inner leg (72a) having the cover securing area (72a) at a free end of the inner leg (72a);
a substantially axially extending intermediate leg arranged radially between the outer leg and the inner leg;
a radially extending connecting portion connecting the outer leg (72b) to the intermediate leg, the outer leg with the connecting portion and intermediate leg forming a U-shaped annular groove in the annular cover, the annular groove configured for receiving an annular sealing projection (112) of the coupling member (14) when the filter element is in a mounted state;
wherein the element cover (32) of the filter element (30) forms a plurality of axially outwardly extending support legs (120) having a first end formed on an axially outwardly facing surface of the element cover (32) and an opposing second end spaced axially outwardly from the outwardly facing surface of the element cover (32);
wherein the second end of the plurality of axially outwardly extending support legs (120) supportively contacts against the connecting portion of the annular cover (72).

2. The exchangeable filter according to claim 1, wherein said cover securing area (72a) is arranged radially inwardly of said terminal coupling end (16), said cover securing area (72a) further including
quick connecting elements (122) forming a screw connection or a bayonet connection with said coupling member (14) said quick connection elements (122) operable by insertion and/or rotation to exchangeably mount said exchangeable filter (10) to said coupling member (14),
a sealing surface (73) is formed on said filter housing (18) at said coupling end (16) between said radial outer sealing area (72b) and said coupling member (14), said sealing surface (113) engaging in a radial direction with said coupling member (14) forming a seal-tight seal with said coupling member (14).

3. The exchangeable filter according to claim 1, wherein said outer and inner legs at least partially form said cover sealing area and said cover securing area at said coupling end (16) of said filter housing (18).

4. The exchangeable filter according to claim 1, wherein said coupling member (14) is a coupling head or a coupling flange of an internal combustion engine.

5. The exchangeable filter according to claim 1, wherein, when in a mounted state, said cover sealing area (72b) abuts against and engages with a corresponding, in radial direction outwardly facing, substantially axially extending sealing area (112) of said coupling member (14);
wherein, when in the mounted state, said cover securing area (72a) abuts against and engages with a corresponding, in radial direction outwardly facing, substantially axially extending securing area (110) of said coupling member (14).

* * * * *